US012043221B2

(12) United States Patent
Caillot et al.

(10) Patent No.: US 12,043,221 B2
(45) Date of Patent: Jul. 23, 2024

(54) WINDSCREEN WIPER BLADE ADAPTER HAVING A MECHANICAL AND MAGNETIC CONNECTION

(71) Applicant: Valeo Systemes d'Essuyage, La Verriere (FR)

(72) Inventors: Gerald Caillot, La Verriere (FR); Mehdi Belhaj, La Verriere (FR); Alexandre Filloux, La Verriere (FR); Vincent Izabel, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 69 days.

(21) Appl. No.: 17/603,811

(22) PCT Filed: Mar. 19, 2020

(86) PCT No.: PCT/EP2020/057702
§ 371 (c)(1),
(2) Date: Oct. 14, 2021

(87) PCT Pub. No.: WO2020/221508
PCT Pub. Date: Nov. 5, 2020

(65) Prior Publication Data
US 2022/0194324 A1 Jun. 23, 2022

(30) Foreign Application Priority Data

Apr. 30, 2019 (FR) ...................... 1904577

(51) Int. Cl.
*B60S 1/40* (2006.01)
*F16B 1/00* (2006.01)

(52) U.S. Cl.
CPC ........... *B60S 1/4048* (2013.01); *B60S 1/4045* (2013.01); *B60S 2001/4054* (2013.01); *F16B 1/00* (2013.01); *F16B 2200/83* (2023.08)

(58) Field of Classification Search
CPC .... B60S 1/4038; B60S 1/4045; B60S 1/4048; B60S 2001/4051; B60S 2001/4054;
(Continued)

(56) References Cited

U.S. PATENT DOCUMENTS

| 10,391,978 B2 | 8/2019 | Gaucher | |
|---|---|---|---|
| 2007/0067941 A1* | 3/2007 | Huang | ................... B60S 1/4038 15/250.43 |

(Continued)

FOREIGN PATENT DOCUMENTS

| CN | 108674373 A | | 10/2018 |
|---|---|---|---|
| DE | 102012021489 | * | 5/2013 |

(Continued)

OTHER PUBLICATIONS

Machine translation of description portion of German publication 102012021489, published May 2013. (Year: 2013).*

(Continued)

*Primary Examiner* — Gary K. Graham
(74) *Attorney, Agent, or Firm* — Valeo Systemes d'Essuyage

(57) ABSTRACT

A vehicle wiper blade adapter that includes a mechanical connection region receiving a tab of a wiper arm and a permanent magnet that interacts with the wiper arm, a magnetic connection region that receives the permanent magnet, the permanent magnet being rigidly secured to the adapter by a securing means at a receiving region and a magnetic shield placed between an adapter body and the permanent magnet, where the magnetic shield includes at least one loop that interacts with at least one respective adapter claw.

7 Claims, 6 Drawing Sheets

(58) Field of Classification Search
CPC ............... B60S 2001/4058; F16B 1/00; F16B 2001/0035; F16B 2200/83
USPC ..................................................... 15/250.32
See application file for complete search history.

(56) References Cited

U.S. PATENT DOCUMENTS

| | | | | |
|---|---|---|---|---|
| 2007/0226940 | A1* | 10/2007 | Thienard | B60S 1/4038 15/250.32 |
| 2013/0192016 | A1* | 8/2013 | Kim | B60S 1/0408 15/250.201 |
| 2015/0096142 | A1 | 4/2015 | Zeiser et al. | |
| 2018/0326949 | A1 | 11/2018 | Carrion et al. | |

FOREIGN PATENT DOCUMENTS

| | | |
|---|---|---|
| DE | 102012021489 A1 | 5/2013 |
| EP | 2597000 A1 | 5/2013 |
| EP | 2597001 A2 | 5/2013 |
| FR | 3027268 A1 | 4/2016 |
| JP | 2006507991 A | 3/2006 |
| JP | 2010083262 A | 4/2010 |
| JP | 201697965 A | 5/2016 |
| WO | 9001438 A1 | 2/1990 |
| WO | 2004048163 A1 | 6/2004 |

OTHER PUBLICATIONS

European Patent Office, International Search Report (w/English translation) and Written Opinion of corresponding international application No. PCT/EP2020/057702, dated May 25, 2020.
Japanese Patent Office, Office Action (with English translation) of corresponding Japanese Patent Application No. 2021-564571, dated Oct. 14, 2022.
Chinese Patent Office, Office Action of corresponding Chinese Patent Application No. 202080032608.6, dated Apr. 1, 2023.

* cited by examiner

[Fig. 1]
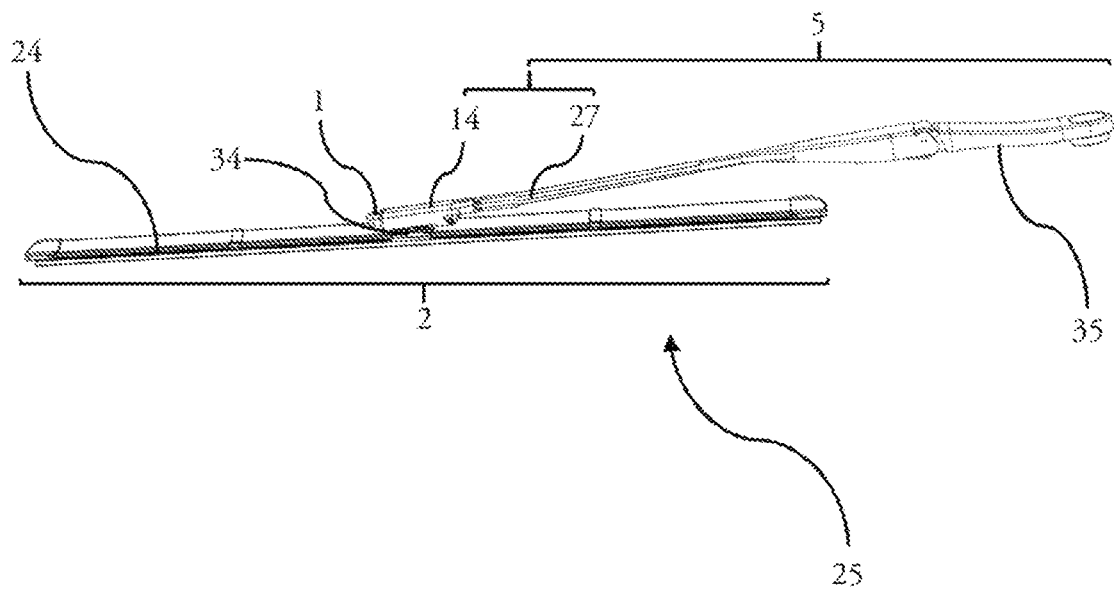
[Fig. 2]
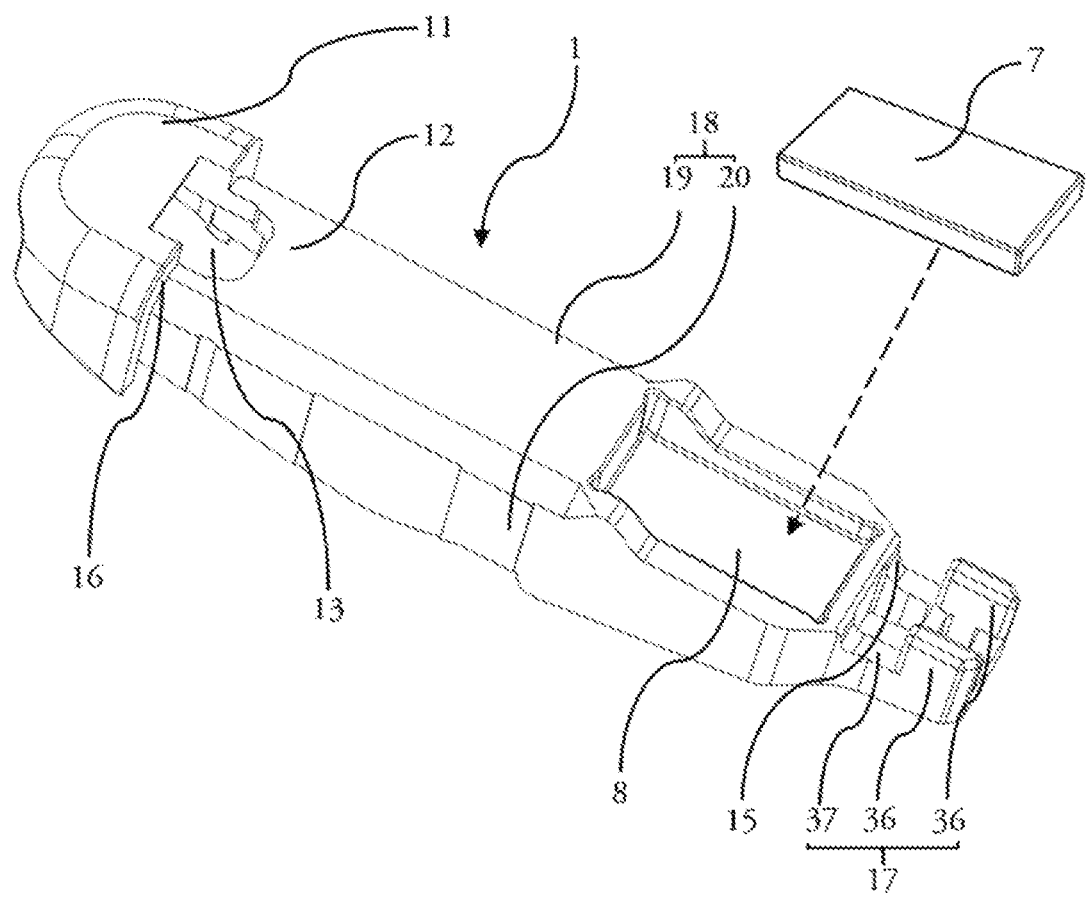

[Fig. 3]
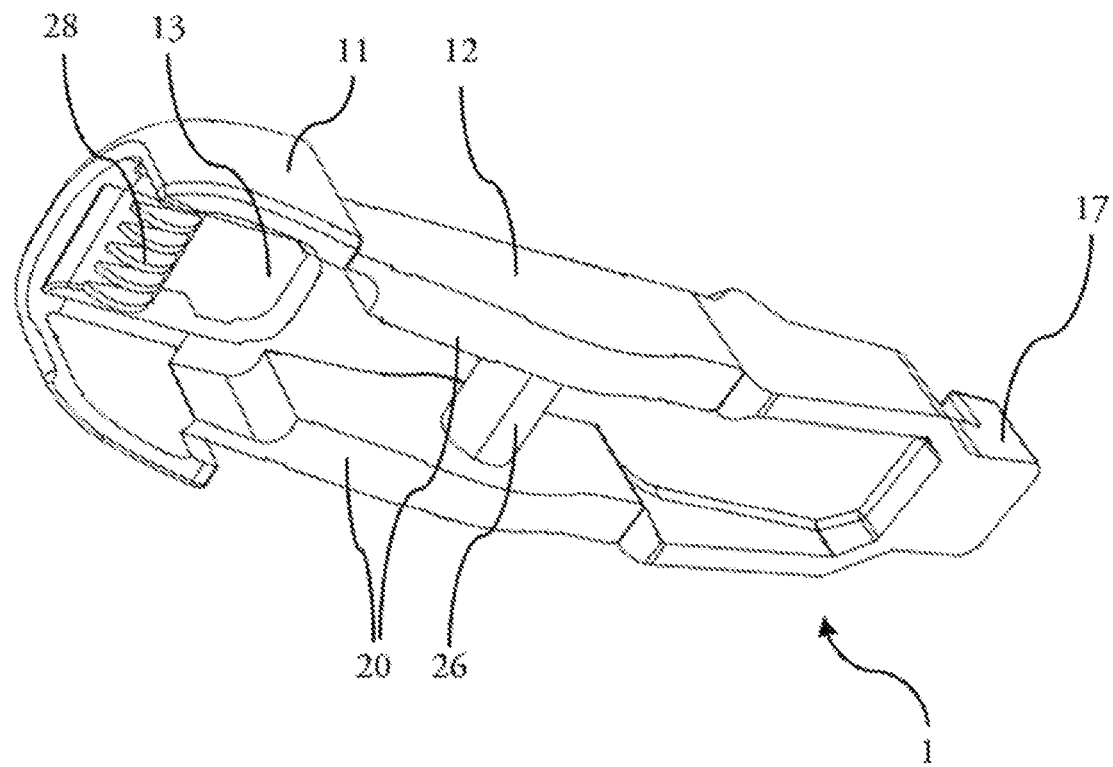
[Fig. 4]
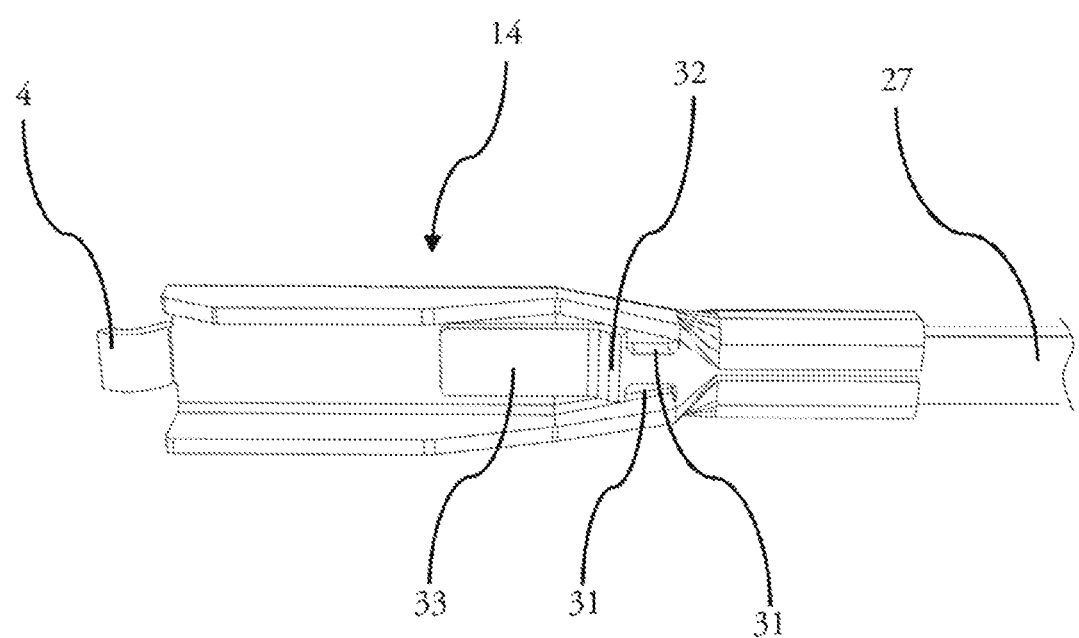

[Fig. 5]
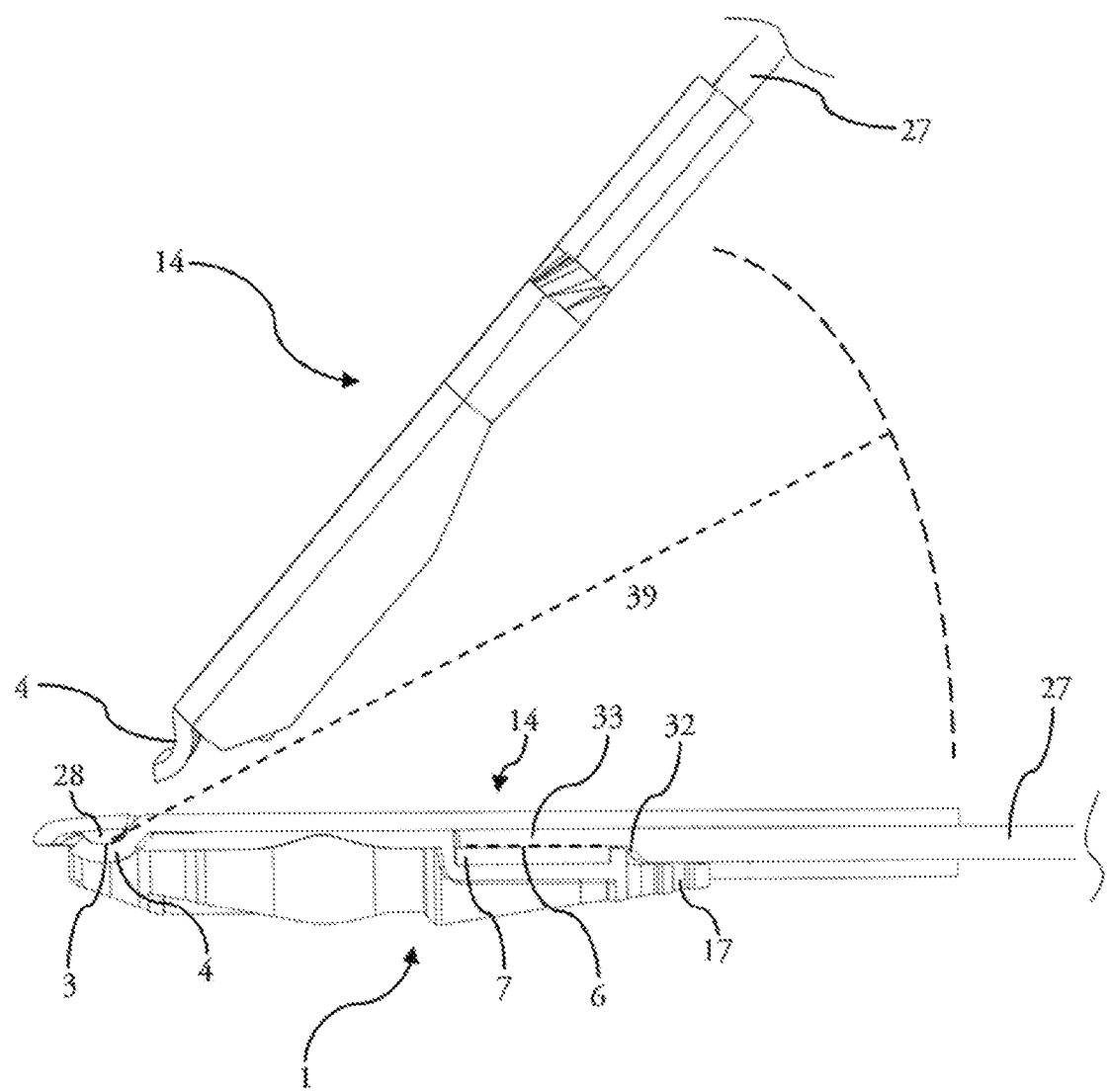

[Fig. 6]
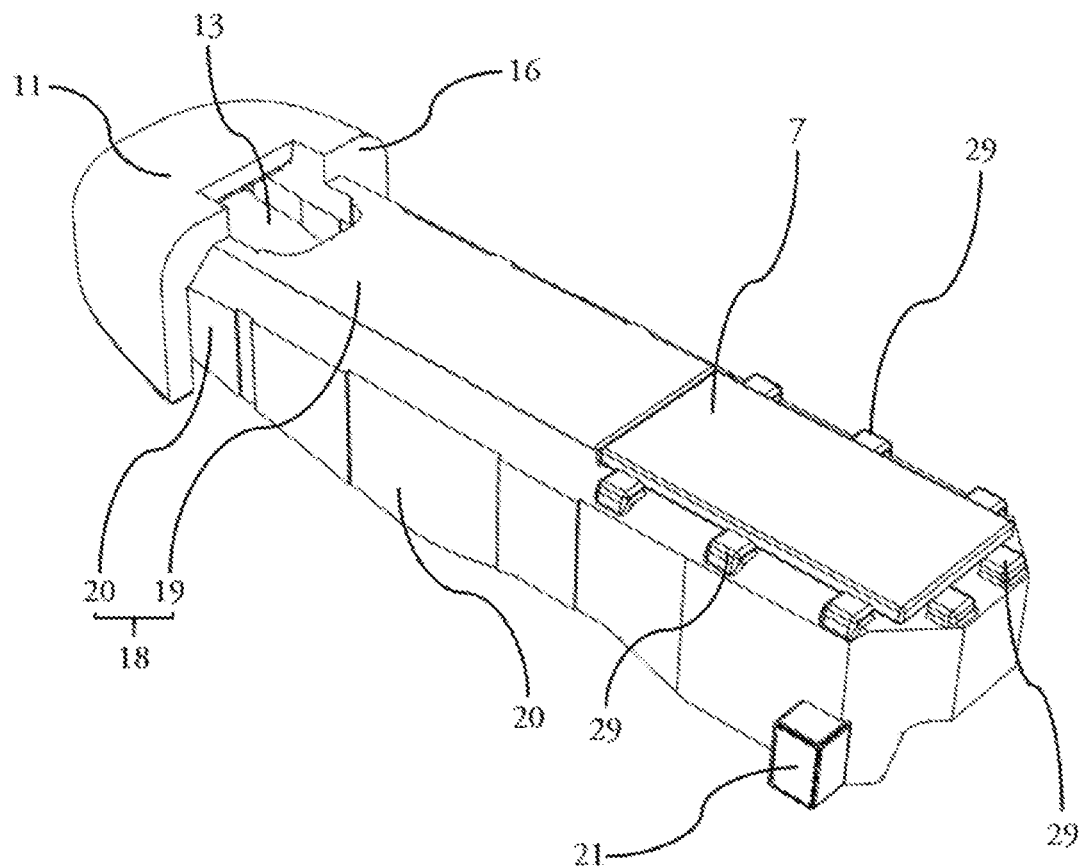
[Fig. 7]
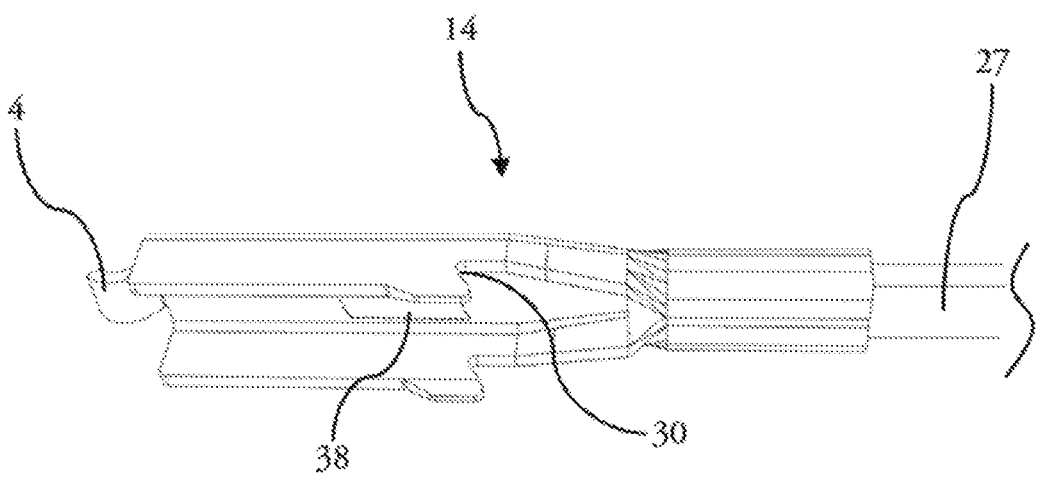

[Fig. 8]
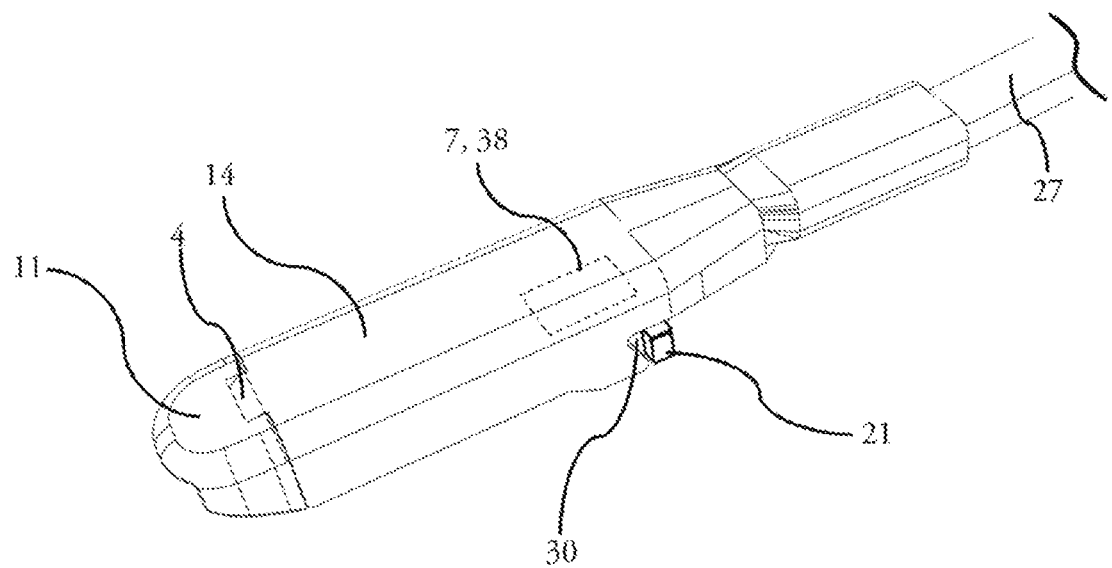
[Fig. 9a]
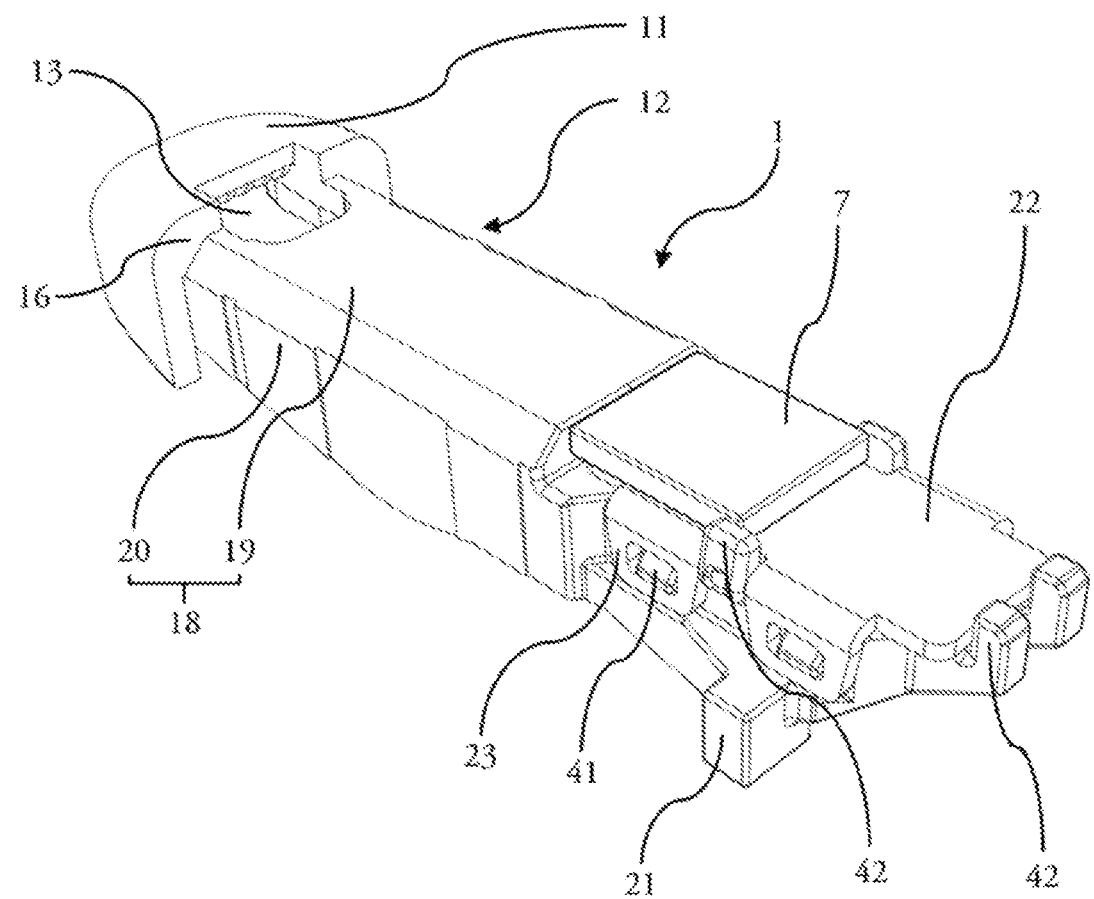

[Fig. 9b]
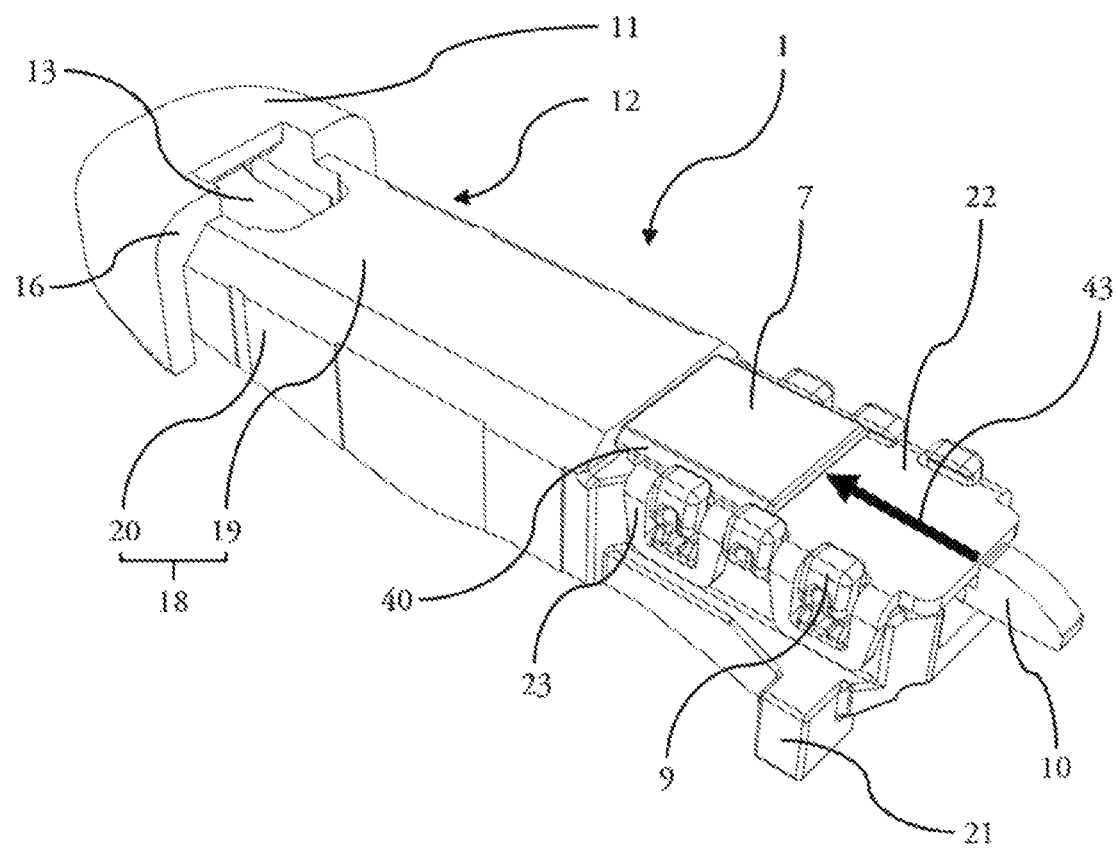

WINDSCREEN WIPER BLADE ADAPTER HAVING A MECHANICAL AND MAGNETIC CONNECTION

CROSS-REFERENCE TO RELATED APPLICATIONS

This application is filed under 35 U.S.C. § 371 U.S. National Phase of International Application No. PCT/EP2020/057702 filed Mar. 19, 2020 (published as WO2020221508), which claims priority benefit to French application No. 1904577 filed on Apr. 30, 2019 (published as FR3095626), the disclosures of which are herein incorporated by reference in their entirety.

TECHNICAL FIELD

The present invention relates to a windscreen wiper blade adapter, a wiper blade equipped with such an adapter, a wiping system comprising such a wiper blade, and a method for assembling such a wiping system.

The invention relates to the field of wiping and/or cleaning glazed surfaces of motor vehicles.

BACKGROUND ART

In general, a wiping system for a motor vehicle comprises at least one wiper arm intended to perform an angular back-and-forth movement, to which is connected a wiper blade which comprises a wiper rubber. It is this wiper rubber which is in contact with the glazed surface of the vehicle and, driven by the angular back-and-forth movement of the wiper arm, will wipe and/or clean the glazed surface in the event of bad weather or washing of said glazed surface, in order to ensure a clear and unobstructed view for the driver of the vehicle. To ensure the connection between the wiper blade and the wiper arm, the wiping system is equipped with an adapter which interacts with the wiper blade on the one hand, and with an end of the wiper arm, on the other hand.

This connection allows replacement of the wiper blades in the event of wear. It is known practice to provide such a connection by means of magnetic connectors which have the advantage of improving the ergonomics of assembling the wiper blade on the wiper arm.

However, disassembly is not optimal, because it requires either pressing a push button to undo the connection, or detaching the magnet by a vertical translational movement, which is also not very ergonomic because significant effort may be required to detach the magnet.

SUMMARY

The present invention improves the ergonomics of this magnetic connection system.

It consists of an adapter for a vehicle wiper blade, comprising a mechanical connection region configured to receive a tab of a wiper arm and a magnetic connection region configured to receive at least one permanent magnet and interact with the wiper arm.

The adapter according to the invention comprises a body and a head. The mechanical connection region is provided for the insertion of one end of a wiper arm, this mechanical connection region comprising a hole through which the end of the arm is inserted and an internal wall of the head against which the end of the arm bears and pivots.

The adapter is rigidly secured to the wiper arm by the magnetic connection, by bringing the wiper blade up to the wiper arm, at its magnetic connection region.

Advantageously, disassembly of the wiper blade is ergonomic because it is achieved by tilting around the mechanical connection region, which requires less effort to detach the permanent magnet from the wiper arm.

According to one aspect of the invention, the magnetic connection region comprises a receiving region, configured to receive the permanent magnet.

According to the embodiment, the receiving region is a cavity in which the permanent magnet is housed, so as to embed the latter in the thickness of the upper wall of the adapter. This prevents the magnet from sticking out from this upper wall and creating mechanical interference. The receiving region may also be a rectangular region delimited longitudinally and transversely by separate studs and intended to receive the permanent magnet. The function of these different types of receiving regions will be described in more detail below.

According to one aspect of the invention, the adapter comprises at least the permanent magnet rigidly secured to the adapter by interaction of shapes, force-fitted, adhesively bonded or overmolded in the receiving region.

The permanent magnet is ideally a neodymium magnet, in order to provide strong magnetism. The permanent magnet must be rigidly secured to the adapter in a manner strong enough to withstand the mechanical forces at play when the wiping system is in operation. The various securing means described above are therefore all indicated to meet this condition.

Naturally, other compositions of the permanent magnet could also be considered depending on the particular needs of each implementation of the invention.

According to one aspect of the invention, the adapter comprises at least one claw which holds the permanent magnet in place.

The adapter includes at least one claw positioned around the permanent magnet receiving region. The claw shape in this case serves to delimit a free space corresponding to the thickness of the permanent magnet. The tip of the claw is curved toward the upper face of the permanent magnet so as to keep it in its receiving region. The permanent magnet is therefore not subjected to movement when the wiping system is in operation.

According to one aspect of the invention, the adapter comprises at least one flexible tongue which retracts for insertion of the permanent magnet under the claw and which holds the permanent magnet in place longitudinally.

During assembly, the permanent magnet is slid under the claw by longitudinal translation. The claw prevents any transverse movement of the magnet, and a stop means in the permanent magnet receiving region prevents any longitudinal movement in the direction of translation of the permanent magnet during assembly. To prevent longitudinal movement in the opposite direction, the adapter includes a flexible tongue at its longitudinal end. This tongue flexes toward the wiper blade as the permanent magnet is translationally inserted under the claw. Once the permanent magnet has been inserted, the flexible tongue returns to its initial position and thus prevents any longitudinal movement in the opposite direction to the direction of insertion of the permanent magnet.

The magnetic connection region equipped with the permanent magnet is configured to interact with the wiper arm.

In another embodiment, the magnetic connection region equipped with the permanent magnet is configured to interact with a rod of the wiper arm, such a rod being equipped at its end with a yoke.

In another embodiment, the magnetic connection region equipped with the permanent magnet is configured to interact with a yoke of the wiper arm, such a yoke being rigidly secured to a rod constituting the wiper arm.

The rod is crimped in a U-shaped yoke extending in a transverse plane to ensure its mechanical retention. The rod and/or the yoke are made of metal in order to ensure the magnetic connection with the permanent magnet of the adapter.

According to one aspect of the invention, the adapter comprises a head and a body, the head being wider and higher than the body, as well as a hole configured to receive the tab of a yoke of the wiper arm.

The difference in dimensions between the head and the body of the adapter creates an additional stop means when the arm/blade connection is made The yoke is pressed against a shoulder created by this difference in height between the two elements of the adapter. The hole in turn allows the insertion of a tab which emerges from the end of the yoke and thus creates the mechanical retention means when the arm and blade are connected. The hole is located straddling the head and body to allow the yoke to be put in place while ensuring that it abuts against the shoulder provided at the border between the head and the body.

The adapter extends in a longitudinal direction and includes at least one wall forming a stop means configured to interact with the wiper arm so as to lock the adapter relative to the arm in the longitudinal direction.

When the connection between the wiper arm and the wiper blade is made, the stop means maintains the connection in a longitudinal direction. The connection between the wiper blade and the wiper arm is then resistant to the centrifugal force caused by the angular back-and-forth movement of the wiper arm when the system is in operation.

The wall forming a stop means is carried by an L-shaped extension extending in a longitudinal plane and provided at a longitudinal end of the adapter.

In this embodiment, the stop means interact with the rod and/or the yoke of the wiper arm, so that retention of the wiper blade is optimal.

The adapter has a U-shaped section extending in a transverse plane formed by an upper wall and two side walls, the wall forming a stop means being carried by a projection emerging from at least one of the side walls.

In this embodiment, the stop means is located on the side wall of the adapter. The stop means extends thereon perpendicularly, forming a projection on the adapter. The yoke comprises, in this embodiment, a notch intended to receive the stop means of the adapter. This stop means prevents longitudinal movements of the wiper blade.

According to one aspect of the invention, the adapter comprises a magnetic shield configured to be interposed between the body of the adapter and the permanent magnet.

It is possible to include a magnetic shield under the permanent magnet. This magnetic shield is a metal part, with dimensions greater than or equal to those of the magnet, for pushing the magnetic field of the magnet toward the wiper arm, in order to strengthen the magnetic connection resulting from the magnetic connection region. The magnetic force is then concentrated toward the yoke of the wiper arm and, with its increased power, improves the magnetic connection between the wiper arm and the wiper blade.

According to one aspect of the invention, the magnetic shield comprises at least one loop which interacts with at least one claw of the adapter to rigidly secure the magnetic shield to the adapter.

The magnetic shield includes at least one loop on its side wall. The size of this loop is such that the claw that retains the permanent magnet can be inserted therein. The magnetic shield is thus attached by virtue of the interaction between the loop and the claw. The presence of the magnetic shield does not in any way encroach on the space left by the claw for the translational insertion of the permanent magnet.

The invention also covers a wiper blade of a vehicle wiping system comprising at least one adapter as described above.

The adapter is directly connected by a pivoting link to a connector that carries the wiper blade. A wiper blade having such an adapter can therefore be fitted to any type of vehicle having the wiper arm complementary to the wiper blade and allowing a mechanical and magnetic connection.

The invention also covers a vehicle wiping system comprising a wiper arm and a wiper blade as previously described.

The wiper arm includes the rod crimped in the yoke. The rod forms the connection between the yoke and the end of the arm which is directly connected to the device for actuating the back-and-forth movement of the wiping system. The wiper blade is as described above and includes the aforementioned adapter.

The invention also relates to a method for assembling a wiper blade on a wiper arm, comprising:
- step of inserting a tab which emerges from a longitudinal end of the yoke of the wiper arm in a hole in the adapter,
- a step of pivoting the blade relative to the arm about a pivot axis passing through a mechanical connection region between the tab and the adapter,
- a step of producing a magnetic connection between the permanent magnet rigidly secured to the adapter of the wiper blade and the wiper arm.

The tab of the yoke is inserted in the hole in the adapter. Thanks to a pivoting movement of the blade, the tab ensures mechanical retention by being directly in contact with the internal wall of the adapter. This contact region corresponds to the mechanical connection region. The pivoting of the blade also brings the permanent magnet up to the metal part of the wiper arm intended to interact with the permanent magnet. This is performed until the magnetic connection region is produced.

BRIEF DESCRIPTION OF THE DRAWINGS

FIG. 1 is view of the wiping system as a whole,

FIG. 2 shows a first embodiment of the adapter,

FIG. 3 is a view of the adapter of FIG. 2 from below,

FIG. 4 shows a first embodiment of the yoke and the rod of the wiper arm,

FIG. 5 is a sectional view of the connection between the adapter and the yoke,

FIG. 6 shows a second embodiment of the adapter,

FIG. 7 shows a second embodiment of the yoke and the rod of the wiper arm,

FIG. 8 is a general view of the connection between the adapter and the yoke for the second embodiment, and FIGS. 9a, 9b show an alternative design of the adapter with elements adaptable to any embodiment.

DETAILED DESCRIPTION

FIG. 1 is a view of a motor vehicle wiping system 25 as a whole. The wiping system 25 comprises a wiper blade 2 and a wiper arm 5. The wiper blade 2 includes an adapter 1, a connector 34 and a wiper rubber 24. It is the wiper rubber 24 which is in direct contact with the glazed surface of the vehicle and which cleans that surface. The connector 34 forms the connection between the wiper rubber 24 and the adapter 1. The adapter 1 is largely concealed by the yoke 14 of the wiper arm 5 and will be described in more detail below. The adapter 1 is directly connected to the yoke 14 and therefore ensures the connection between the wiper blade 2 and the wiper arm 5.

The movement of the wiper blade 2 is induced by the wiper arm 5. The wiper arm 5 comprises a drive device 35, a yoke 14 and a rod 27 crimped in the yoke 14. The yoke 14 is the element which connects to the adapter 1 through a mechanical connection region and a magnetic connection region. The yoke 14 is crimped on the rod 27, which provides the connection between the yoke 14 and the rest of the wiper arm 5. The drive device 35 has one end connected to a motor for rotating the wiping system 25.

The adapter 1 is shown in more detail in FIG. 2, through a first embodiment. The adapter 1 is made up of a head 11 and a body 12. The head 11 is located at a longitudinal end of the adapter 1. It is wider and higher than the body 12, thus creating a shoulder 16, the wall of which corresponds to the difference in width and height between the head 11 and the body 12. A hole 13, located straddling the head 11 and the body 12, is intended to receive one end of the yoke and thus create mechanical contact between the yoke and the adapter 1 in the mechanical connection region.

The body 12 is composed of a U-shaped section 18 which has an upper wall 19 and two side walls 20 located on either side of the upper wall 19. The body 12 also comprises on its outer surface a receiving region 8 intended to receive a permanent magnet 7, shown in exploded view. The permanent magnet 7 is rigidly secured in the receiving region 8 by interaction of shapes, force-fitting, adhesive bonding or overmolding. In this embodiment, the receiving region 8 is a cavity so that the permanent magnet 7 is embedded in the thickness of the surface of the body 12 of the adapter 1, in such a way that the upper plane of the permanent magnet 7 is substantially aligned with the upper plane of the body 12 of the adapter 1.

Opposite the head 11, the end of the body 12 includes an L-shaped extension 17 extending in a longitudinal plane. This L-shaped extension 17 has a recess 37 creating a stop means 15. This stop means 15 is intended to prevent the longitudinal movements caused by the operation of the wiping system 25 by maintaining the connection between the adapter 1 and the yoke 14. The L-shaped extension 17 ends with two protrusions 36 which extend upwardly for interaction with the wiper arm for improved connection of the wiper blade to the arm.

FIG. 3 shows the adapter 1, which is identical to that of FIG. 2. The view from below shows an internal wall 28 of the adapter 1. The internal wall 28 is formed by a series of disk portions formed on the internal face of the head 11 of the adapter 1. The internal wall 28 is juxtaposed with the hole 13. It is at the internal wall 28 that the contact between the wiper blade and the wiper arm will take place by virtue of the internal wall 28 of the adapter 1 and the yoke, respectively. A fastening means 26 is present under the body 12, and extends transversely between the two side walls 20. This fastening means 26 ensures the connection between the adapter 1 and the connector 34 mentioned in FIG. 1.

The adapter is designed to interact with the yoke 14 of the wiper arm. This yoke 14 is shown from below in FIG. 4. The yoke 14 is in the shape of a U extending in a transverse plane, and it is configured to be crimped on a rod 27.

A tab 4 is present at the free end of the yoke 14. This tab 4 has a slightly curved shape which is complementary to the series of disk portions formed on the internal face of the head of the adapter. It is this tab 4 that participates in the mechanical contact between the adapter and the yoke 14, in the mechanical connection region. The tab 4 is intended to be inserted in the hole in the adapter and to establish direct contact with the internal wall in the mechanical connection region.

The rod 27 is made of metal and allows the connection with the rest of the wiper arm. In this embodiment, the rod 27 also has the function of magnetic interaction with the adapter, in an uncrimped portion of the yoke 14. The shape of the rod 27 varies depending on the type of interaction with the adapter.

One end of the rod 27 is flat. It corresponds to an interacting part 33 that interacts with the permanent magnet. The magnetic connection region is therefore the region of contact between the permanent magnet of the adapter and the interacting part 33 of the rod 27.

The rod 27 has a difference in thickness between the interacting part 33 and the rest of the rod 27, creating a rod stop means 32. When the connection between the wiper blade and the wiper arm is made, the rod stop means 32 is in direct contact with the stop means 15 of the adapter because the stop means 32 is housed in the recess in the adapter formed between the L-shaped extension and the receiving region. This contact increases the resistance to centrifugal force caused by the operation of the wiping system. The contact between the adapter stop means and the rod stop means 32 helps maintain the connection between the wiper blade and the wiper arm.

The rod 27 comprises two indentations 31 located between the rod stop means 32 and the crimping region of the yoke 14. The indentations 31 are positioned such that they are facing the L-shaped extension, more particularly at the protrusions on the L-shaped extension when the connection between the wiper blade and the wiper arm is established.

FIG. 5 is a longitudinal sectional view of the connection between the wiper blade and the wiper arm. The section is taken along a sectional plane formed by longitudinal and vertical axes. In order to illustrate the method for connection between the wiper blade and the wiper arm, the yoke 14 is also shown in full view. Several steps are necessary to establish the connection between the wiper blade and the wiper arm:

- the tab 4 of the yoke 14 is inserted in the hole 13 in the adapter 1,
- a pivoting movement of the wiper blade is performed, about a pivot axis 39 passing through the mechanical connection region 3 between the tab 4 and the adapter 1, on the one hand to establish mechanical contact between the tab 4 of the yoke 14 and the internal wall 28 of the adapter 1 in the mechanical connection region 3, and on the other hand to establish magnetic contact between the permanent magnet 7 of the adapter 1 and the interacting part 33 of the metal rod 27, in the magnetic connection region 6.

FIG. 5 focuses on the two connection regions between the wiper blade and the wiper arm. The mechanical connection region 3 is located to the left of the figure. This is the point of contact between the tab 4 of the yoke 14 and the internal wall 28 of the adapter 1. After insertion of the tab 4 in the hole 13, the pivoting movement of the wiper blade 2 generates direct contact between the surface of the tab 4 and the surface of the internal wall 28 in the mechanical connection region 3.

The magnetic connection region 6 is located at the point of contact between the permanent magnet 7 and the interacting part 33 of the rod 27 and is shown in dotted lines.

When the assembly process is completed, the connection between the wiper blade and the wiper arm is complete. The yoke 14 is held in place in the longitudinal direction by contact between the end of the yoke 14 and the shoulder 16 of the head 11 of the adapter 1. The same function is provided between the rod stop means 32 and the stop means 15 of the adapter 1. These two points of contact are not shown in FIG. 5. This longitudinal retention is reinforced by the interaction between the protrusions on the L-shaped extension 17 of the adapter 1 and the indentations 31 in the rod 27. The indentations 31 in the rod 27 are two empty spaces formed in the rod 27. When the connection between the wiper blade and the wiper arm is established, the protrusions on the L-shaped extension 17 of the adapter 1 will fill the empty spaces created by the indentations 31 in the rod 27, thereby reinforcing the maintenance of the connection in the longitudinal direction.

A second embodiment of the adapter 1 of the wiper blade 2 and the yoke 14 of the wiper arm is also possible.

The adapter 1 of the second embodiment is shown in FIG. 6. It comprises a head 11 and a body 12, of different width and height so as to create a shoulder 16. The body 12 is still composed of a U-shaped section 18 extending in a transverse plane comprising an upper wall 19 and two side walls 20.

The differences between the two embodiments lie in the region for receiving the permanent magnet 7 and in the mode of longitudinal retention between the wiper blade and the wiper arm. The region for receiving the permanent magnet 7 is a rectangular region delimited longitudinally and transversely by studs 29. In this embodiment, the permanent magnet 7 is adhesively bonded to the receiving region. The studs 29 are separate from one another and delimit the perimeter of the permanent magnet 7. The permanent magnet 7 is positioned in the receiving region such that the upper plane of the permanent magnet 7 is substantially aligned with the upper plane of the body 12 of the adapter 1.

The shoulder 16 is the only stop means common to both embodiments. In this embodiment, the stop means for reinforcing longitudinal retention is located on the side wall(s) 20, taking the form of at least one lateral projection 21 on the side wall 20. The lateral projection 21 has a parallelepipedal shape extending transversely and interacts with the yoke as will be described below.

The yoke 14 of the second embodiment is shown in FIG. 7. As in the first embodiment, it comprises a tab 4 at its longitudinal free end. The function of the tab 4 is identical to that described in the first embodiment.

Magnetic contact is directly established with the yoke 14 through a contact portion 38 located on an internal wall of the yoke 14 and shown in dotted lines.

The structure of the yoke 14 is different for this embodiment, due to the presence of at least one notch 30, present on at least one of the side walls of the yoke 14. The notch 30 is positioned transversely at the height of the contact portion 38. The notch 30 is V-shaped, extending in a plane parallel to the longitudinal direction, and has the function of interacting by direct contact with the lateral projection located on the side wall of the adapter as described below.

FIG. 8 shows the connection between the yoke 14 and the adapter 1 of the second embodiment. The assembly method is the same as in the first embodiment. The magnetic connection region is characterized by the point of contact between the permanent magnet 7 and the contact portion 38 of the yoke 14 and is shown in dotted lines.

The difference between the embodiments visible in FIG. 8 concerns the longitudinal retention of the connection. When assembly is complete, longitudinal retention is ensured by a point of contact between the lateral projection 21 of the adapter and the notch 30 of the yoke 14. The lateral projection 21 is therefore received in the V shape taking the form of the notch 30. Although the structure of the stop means is different in the two embodiments, the function remains the same, namely longitudinal retention of the wiper blade against the centrifugal force caused by the angular back-and-forth movement of the wiper arm.

It will also be obvious that, in other possible embodiments, it could be the case that the lateral projection 21 has a simple vertical edge, without a notch.

FIGS. 9*a* and 9*b* show alternative means of implementation in the region for receiving the permanent magnet 7. These modifications can be applied to any of the embodiments presented above.

In FIGS. 9*a* and 9*b*, the region for receiving the permanent magnet 7 comprises a magnetic shield 22 positioned between the body 12 of the adapter 1 and the permanent magnet 7. The permanent magnet 7 is in this case truncated for the sake of visibility. The magnetic shield 22 is a bent metal plate which redirects, toward the magnetic connection region, magnetic flux lines that in the absence of such a magnetic shield would usually be directed toward the adapter 1. This increases the magnetic strength of the permanent magnet 7 and improves the magnetic connection between the latter and the yoke or the rod, when the connection between the wiper blade and the wiper arm is made.

Unlike the embodiments presented above, where the permanent magnet 7 was adhesively bonded or overmolded, in FIGS. 9*a* and 9*b* the permanent magnet 7 is held in place by interaction of shapes. The permanent magnet 7 is nevertheless always positioned such that the upper plane of the permanent magnet 7 is substantially aligned with the upper plane of the body 12 of the adapter 1.

To secure the position of the magnetic shield 22, it is equipped with at least one loop 23, advantageously two loops 23 per side. The loops 23 are located on either side of the magnetic shield 22 and are curved downward. In FIG. 9*a*, the loops 23 interact with prominences 41 extending transversely with respect to the adapter 1. Thus, the prominences 41 have a size such that they can pass through the loops 23. This arrangement makes it possible to rigidly secure the magnetic shield 22 with respect to the adapter 1.

The permanent magnet 7 is held in place by protuberances 42 located on the longitudinal end and on the transverse walls of the region for receiving the permanent magnet 7. In FIG. 9*b*, the adapter 1 comprises at least one claw 9, and advantageously a plurality of claws 9, formed in the receiving region 8 for receiving the permanent magnet 7 and made directly in one piece with the adapter 1. The claw 9 delimits a free space corresponding to the thickness of the permanent magnet 7. The tip of the claw 9 is beveled toward the upper face of the permanent magnet 7 so as to retain the latter in its receiving region, thus avoiding an operation to attach the permanent magnet 7 such as adhesive bonding or overmolding. In order to interact with the beveling of the claw 9, the permanent magnet 7 is in this case provided with a chamfer 40 at the part interacting with the claw 9. The permanent magnet 7 is thus inserted by a longitudinal translation 43 between the magnetic shield 22 and the beveled part of the claw 9.

However, in other embodiments that have not been shown, it could be that the permanent magnet 7 is held in place by overmolding the adapter 1 on the body, in combination with or instead of mechanical retention means such as in the embodiments described above. Such a configuration would be particularly advantageous for protecting magnets made of a composition susceptible to corrosion (some neodymium magnets, for example), without needing to apply a protective coating to the magnets.

As in FIG. 9*a*, in FIG. 9*b* the magnetic shield 22 is equipped with at least one loop 23, advantageously two loops 23 for three claws 9, a claw 9 being inserted or not inserted in a loop 23 alternately. The loops 23 are located on either side of the magnetic shield 22 and are curved downward so as to interact with the claws 9. Thus, the claw 9 has a size such that it can pass through the loop 23. This arrangement makes it possible to rigidly secure the magnetic shield 22 with respect to the adapter 1.

In FIG. 9*b*, the adapter 1 comprises a flexible tongue 10 at its rear longitudinal end, i.e. opposite the end where the head is formed. This flexible tongue 10 retracts during the insertion of the permanent magnet 7 by longitudinal translation 43 under the claws 9. Once the permanent magnet 7 has been inserted, the flexible tongue 10 performs a return movement to go back to its initial position and thus blocks any longitudinal movement in the direction opposite to the direction of insertion of the permanent magnet 7.

What is claimed is:

1. An adapter for a vehicle wiper blade, comprising
   a mechanical connection region configured to receive a tab of a wiper arm;
   a magnetic connection region configured to receive at least one permanent magnet and interact with the wiper arm;
   the magnetic connection region including a receiving region receiving the at least one permanent magnet;
   the at least one permanent magnet configured to rigidly secure to the adapter by an interaction of shapes, a force-fitting, an adhesive bonding, or by an overmolding means in the receiving region; and
      a magnetic shield configured to be interposed between a body of said adapter and the at least one permanent magnet;
   where the magnetic shield includes at least one loop, which interacts with at least one claw of said adapter.

2. The adapter of claim 1, including at least one claw which is adapted to hold the permanent magnet in place.

3. The adapter of claim 2, including at least one flexible tongue which retracts for insertion of the permanent magnet under the at least one claw which is adapted to hold the permanent magnet, and which holds the permanent magnet in-place longitudinally.

4. The adapter of claim 1, including a head and a body; the head being wider and higher than the body; and
   the adapter including a hole configured to receive the tab of a yoke of the wiper arm.

5. The adapter of claim 1, the at least one claw configured to rigidly secure the magnetic shield with the adapter.

6. A wiper blade of a vehicle wiping system including at least one adapter of claim 1.

7. A vehicle wiping system including a wiper arm and a wiper blade of claim 6.

* * * * *